(12) United States Patent
Elbsat et al.

(10) Patent No.: US 11,281,168 B2
(45) Date of Patent: *Mar. 22, 2022

(54) CENTRAL PLANT CONTROL SYSTEM BASED ON LOAD PREDICTION THROUGH MASS STORAGE MODEL

(71) Applicant: Johnson Controls Tyco IP Holdings LLP, Milwaukee, WI (US)

(72) Inventors: Mohammad N. Elbsat, Milwaukee, WI (US); Michael J. Wenzel, Grafton, WI (US); Graeme Willmott, West Milwaukee, WI (US); Matthew J. Asmus, Watertown, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/071,633

(22) Filed: Oct. 15, 2020

(65) Prior Publication Data

US 2021/0055701 A1    Feb. 25, 2021

Related U.S. Application Data

(63) Continuation of application No. 16/048,162, filed on Jul. 27, 2018, now Pat. No. 10,824,125.

(Continued)

(51) Int. Cl.
*G05B 13/04* (2006.01)
*G05F 1/66* (2006.01)
(Continued)

(52) U.S. Cl.
CPC .......... *G05B 13/048* (2013.01); *G05B 19/04* (2013.01); *G05B 19/042* (2013.01); *G05F 1/66* (2013.01);
(Continued)

(58) Field of Classification Search
None
See application file for complete search history.

(56) References Cited

U.S. PATENT DOCUMENTS 7,580,775 B2   8/2009   Kulyk et al.
7,894,946 B2   2/2011   Kulyk et al.
(Continued)

OTHER PUBLICATIONS

Office Action on EP 18186277.2, dated Jan. 28, 2021, 5 pages.
(Continued)

*Primary Examiner* — Mohammad Ali
*Assistant Examiner* — Kelvin Booker
(74) *Attorney, Agent, or Firm* — Foley & Lardner LLP

(57) ABSTRACT

Disclosed herein are related to a system, a method, and a non-transitory computer readable medium for operating an energy plant. In one aspect, the system generates a regression model of a produced thermal energy load produced by a supply device of the plurality of devices. The system predicts the produced thermal energy load produced by the supply device for a first time period based on the regression model. The system determines a heat capacity of gas or liquid in the loop based on the predicted produced thermal energy load. The system generates a model of mass storage based on the heat capacity. The system predicts an induced thermal energy load during a second time period at a consuming device of the plurality of devices based on the model of the mass storage. The system operates the energy plant according to the predicted induced thermal energy load.

20 Claims, 8 Drawing Sheets

Related U.S. Application Data

(60) Provisional application No. 62/538,180, filed on Jul. 28, 2017.

(51) Int. Cl.
  *G05B 19/04* (2006.01)
  *F24F 11/46* (2018.01)
  *G05B 19/042* (2006.01)
  *F24F 110/10* (2018.01)
  *F24F 140/50* (2018.01)

(52) U.S. Cl.
  CPC ............ *F24F 11/46* (2018.01); *F24F 2110/10* (2018.01); *F24F 2140/50* (2018.01); *G05B 2219/163* (2013.01); *G05B 2219/2614* (2013.01); *G05B 2219/2642* (2013.01)

(56) References Cited

U.S. PATENT DOCUMENTS

| | | | |
|---|---|---|---|
| 8,301,359 B1* | 10/2012 | Sagar | G05B 19/042 701/109 |
| 8,527,108 B2 | 9/2013 | Kulyk et al. | |
| 8,527,109 B2 | 9/2013 | Kulyk et al. | |
| 8,903,554 B2 | 12/2014 | Stagner | |
| 8,918,223 B2 | 12/2014 | Kulyk et al. | |
| 9,110,647 B2 | 8/2015 | Kulyk et al. | |
| 9,703,339 B2 | 7/2017 | Kulyk et al. | |
| 10,139,877 B2 | 11/2018 | Kulyk et al. | |
| 2006/0180300 A1 | 8/2006 | Lenehan et al. | |
| 2009/0093916 A1* | 4/2009 | Parsonnet | G05B 15/02 700/286 |
| 2010/0179704 A1* | 7/2010 | Ozog | H02J 13/0006 700/291 |
| 2014/0009151 A1 | 1/2014 | Van Helvoort | |
| 2015/0316901 A1* | 11/2015 | Wenzel | G06Q 50/06 700/291 |
| 2015/0316902 A1 | 11/2015 | Wenzel et al. | |
| 2016/0187894 A1 | 6/2016 | Malky | |
| 2016/0195866 A1 | 7/2016 | Turney et al. | |
| 2016/0283844 A1 | 9/2016 | Jones et al. | |
| 2017/0031962 A1* | 2/2017 | Turney | G05B 15/02 |
| 2017/0179716 A1* | 6/2017 | Vitullo | H02J 3/00 |
| 2019/0032944 A1* | 1/2019 | Wenzel | F24F 11/47 |
| 2019/0032945 A1* | 1/2019 | Willmott | F24F 11/64 |

OTHER PUBLICATIONS

Almeshaiei et al., "A methodology for Electric Power Load Forecasting," Alexandria Engineering Journal, Jan. 21, 2010, (201 I) 50, pp. 137-144.

Anwar et al., Introduction to Load Forecasting, International Journal of Pure and Applied Mathematics, 2018, 199.15, 13 pages.

Astrom. "Optimal Control of Markov Decision Processes with Incomplete State Estimation," J. Math. Anal. Appl., 1965, 10, pp. 174-205.

Bittanti et al., Adaptive Control of Linear Time Invariant Systems: The "Bet on the Best" Principle, Communications in Information and Systems, 2006, 6.4, pp. 299-320.

Chen et al., "Control-oriented System Identification: an H1 Approach," Wiley-Interscience, 2000, 19, Chapters 3 & 8, 38 pages.

Extended European search report on Application No. 18186277.2 dated Jan. 2, 2019. 7 pages.

Feng et al., "Model Predictive Control of Radiant Slab Systems with Evaporative Cooling Sources," Energy and Buildings, 2015, 87, pp. 199-210.

George et al., "Time Series Analysis: Forecasting and Control," Fifth Edition, John Wiley & Sons, 2016, Chapters 4-7 and 13-15, 183 pages.

Hardt et al., "Gradient Descent Learns Linear Dynamical Systems," Journal of Machine Learning Research, 2018, 19, pp. 1-44.

Helmicki et al. "Control Oriented System Identification: a Worstcase/deterministic Approach in H1," IEEE Transactions on Automatic Control, 1991, 36.10, pp. 1163-1176.

Henze et al., "Development of a Predictive Optimal Controller for Thermal Energy Storage Systems," HVAC&R Research, Mar. 1997, 30 pages.

Idowu et al.,"Forecasting Heat Load for Smart District Heating Systems: A Machine Learning Approach", 2014 IEEE International Conference on Smart Grid Communications, Nov. 2014, 6 pages.

Kelman et al., "Bilinear Model Predictive Control of a HVAC System Using Sequential Quadratic Programming," Proceedings of the IFAC World Congress, Sep. 2, 2011, 6 pages.

Kingma et al,. "Adam: A Method for Stochastic Optimization," International Conference on Learning Representations (ICLR), 2015, 15 pages.

Ljung et al., "Theory and Practice of Recursive Identification," vol. 5. JSTOR, 1983, Chapters 2, 3 & 7, 80 pages.

Ljung, editor. "System Identification: Theory for the User," 2nd Edition, Prentice Hall, Upper Saddle River, New Jersey, 1999, Chapters 5 and 7, 40 pages.

Ma et al., "Model Predictive Control for the Operation of Building Cooling Systems", IEEE Transactions on Control Systems Technology, May 2012, 20:3, pp. 796-803.

Ma et al., "Model Predictive Control of Thermal Energy Storage in Building Cooling Systems," Joint 48th IEEE Conference on Decision and Control and 28th Chinese Control Conference Shanghai, P.R. China, Dec. 16-18, 2009, pp. 392-397.

Nevena et al., "Data center cooling using model-predictive control," 32nd Conference on Neural Information Processing Systems, 2018, 10 pages.

Su et al., "Recent Trends in Load Forecasting Technology for the Operation Optimization of Distributed Energy System," Energies 2017, Jun. 2017, 10, 1303, 13 pages.

Verrilli et al., "Model Predictive Control-Based Optimal Operations of District Heating System With Thermal Energy Storage and Flexible Loads," IEEE Transactions On Automation Science and Engineering, Apr. 2017, 14.2, pp. 547-557.

Wang et al., "A Review of Load Forecasting of the Distributed Energy System," ICAESEE 2018, IOP Conf. Series: Earth and Environmental Science, 2018, 237, 11 pages.

Yudong et al., "Predictive Control for Energy Efficient Buildings with Thermal Storage: Modeling, Stimulation, and Experiments." IEEE Control Systems, Feb. 2012, 32.1, pp. 44-64.

Office Action on EP Appl. Ser. No. 18186277.2 dated Aug. 2, 2021 (7 pages).

\* cited by examiner

CENTRAL PLANT CONTROL SYSTEM BASED ON LOAD PREDICTION THROUGH MASS STORAGE MODEL

CROSS-REFERENCE TO RELATED PATENT APPLICATIONS

This application is a continuation of U.S. patent application Ser. No. 16/048,162, filed Jul. 27, 2018, which claims the benefit of U.S. Provisional Patent Application No. 62/538,180, filed Jul. 28, 2017, both of which are incorporated herein by reference in their entireties.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

During periods of low load, chillers may be cycled in order to meet the cooling loads of the connected buildings. In one approach, a chiller may be operated based on rules. For example, once the chilled water temperature reaches a turn-off temperature (e.g., 40° F.), a chiller may be shut off or operate at a minimum load. The chiller may be left off until the return water temperature reaches a turn-on temperature (e.g., 55° F.).

However, turning on and off a chiller based on rules may not be power efficient. For example, a chiller may operate at a temperature below the turn-off temperature for a brief time period (e.g., 20 seconds). Turning the chiller off for such brief time period and turning it back on may be power inefficient compare to leaving the chiller on or operating the chiller at a lower capacity for the brief time period.

SUMMARY

Various embodiments of a system including a controller for an energy plant are disclosed herein. The energy plant includes a loop formed by a plurality of devices. The controller includes a processing circuit comprising a processor and memory storing instructions executed by the processor, the processing circuit configured to obtain load data indicating a produced thermal energy load produced by a supply device of the plurality of devices during a time period. The processing circuit is configured to obtain a temperature of gas or liquid in the loop during the time period. The processing circuit is configured to predict an induced thermal energy load at a consuming device of the plurality of devices during a first portion of the time period based on the produced thermal energy load during a second portion of the time period. The processing circuit is configured to generate a model indicating a relationship between (i) the temperature of the gas or the liquid in the loop and (ii) a difference between the induced thermal energy load and the produced thermal energy load, based on the predicted induced load, the produced thermal energy load, and the temperature. The processing circuit is configured to operate the plurality of devices of the energy plant using the model to control the temperature of the gas or the liquid in the loop.

In one or more embodiments, the first portion of the time period is a non-steady state portion, during which the temperature of the gas or the liquid changes beyond a predetermined range, and the second portion of the time period is steady state time portion, during which the temperature of the gas or the liquid remains within the predetermined range.

In one or more embodiments, the processing circuit is configured to determine a thermal mass of the gas or the liquid in the loop based on the predicted induced load during the non-steady state portion, and generate the model based on the thermal mass.

In one or more embodiments, the processing circuit is configured to obtain another temperature of the gas or the liquid in the loop during another time period after the time period; and predict a deferred load in the loop during the other time period based on the other temperature and the thermal mass.

In one or more embodiments, the processing circuit is configured to obtain additional load data indicating additional produced thermal energy load produced by the supply device during the other time period, and predict an additional induced load at the consuming device during the other time period based on the deferred load and the additional produced thermal energy load during the other time period.

In one or more embodiments, the processing circuit is configured to filter one of the produced thermal energy load and the temperature of the gas or the liquid, and predict the induced load during the non-steady state portion of the time period based on the filtered one of the produced thermal energy load and the temperature of the gas or the liquid.

In one or more embodiments, the processing circuit is configured to assign thermal energy loads to the supply device and the consuming device to maintain the temperature within an allowable temperature range based on the model, and operate the energy plant according to the assigned thermal energy loads.

Various embodiments disclosed herein are related to a method for an energy plant including a loop formed by a plurality of devices. The method includes obtaining load data indicating a produced thermal energy load produced by a supply device of the plurality of devices during a time period. The method includes obtaining a temperature of gas or liquid in the loop during the time period. The method includes predicting an induced thermal energy load at a consuming device of the plurality of devices during a first portion of the time period based on the produced thermal energy load during a second portion of the time period. The method includes generating a model indicating a relationship between (i) the temperature of the gas or the liquid in the loop and (ii) a difference between the induced thermal energy load and the produced thermal energy load, based on the predicted induced load, the produced thermal energy load, and the temperature. The method includes operating the plurality of devices of the energy plant using the model to control the temperature of the gas or the liquid in the loop.

In one or more embodiments, the first portion of the time period is a non-steady state portion, during which the temperature of the gas or the liquid changes beyond a predetermined range, and the second portion of the time period is steady state portion, during which the temperature of the gas or the liquid remains within the predetermined range.

In one or more embodiments, the method further includes determining a thermal mass of the gas or the liquid in the loop based on the predicted induced load during the non-steady state portion; and generating the model based on the thermal mass.

In one or more embodiments, the method further includes obtaining another temperature of the gas or the liquid in the loop during another time period after the time period; and predicting a deferred load in the loop during the other time period based on the other temperature and the thermal mass.

In one or more embodiments, the method further includes obtaining additional load data indicating additional produced thermal energy load produced by the supply device during the other time period; and predicting an additional induced load at the consuming device during the other time period based on the deferred load and the additional produced thermal energy load during the other time period.

In one or more embodiments, the method further includes filtering one of the produced thermal energy load and the temperature of the gas or the liquid; and predicting the induced load during the non-steady state portion of the time period based on the filtered one of the produced thermal energy load and the temperature of the gas or the liquid.

In one or more embodiments, the method further includes assigning thermal energy loads to the supply device and the consuming device to maintain the temperature within an allowable temperature range based on the model; and operating the energy plant according to the assigned thermal energy loads.

Various embodiments disclosed herein are related to a non-transitory computer readable medium storing instructions for an energy plant. The energy plant includes a loop formed by a plurality of devices. The instructions when executed by a processor cause the processor to obtain load data indicating a produced thermal energy load produced by a supply device of the plurality of devices during a time period; obtain a temperature of gas or liquid in the loop during the time period; predict an induced thermal energy load at a consuming device of the plurality of devices during a first portion of the time period based on the produced thermal energy load during a second portion of the time period; generate a model indicating a relationship between (i) the temperature of the gas or the liquid in the loop and (ii) a difference between the induced thermal energy load and the produced thermal energy load, based on the predicted induced load, the produced thermal energy load, and the temperature; and operate the plurality of devices of the energy plant using the model to control the temperature of the gas or the liquid in the loop.

In one or more embodiments, the first portion of the time period is a non-steady state portion, during which the temperature of the gas or the liquid changes beyond a predetermined range, and the second portion of the time period is steady state portion, during which the temperature of the gas or the liquid remains within the predetermined range.

In one or more embodiments, the instructions when executed by the processor further cause the processor to determine a thermal mass of the gas or the liquid in the loop based on the predicted induced load during the non-steady state portion; and generate the model based on the thermal mass.

In one or more embodiments, the instructions when executed by the processor further cause the processor to obtain another temperature of the gas or the liquid in the loop during another time period after the time period; and predict a deferred load in the loop during the other time period based on the other temperature and the thermal mass.

In one or more embodiments, the instruction when executed by the processor cause the processor to: obtain additional load data indicating additional produced thermal energy load produced by the supply device during the other time period; and predict an additional induced load at the consuming device during the other time period based on the deferred load and the additional produced thermal energy load during the other time period.

In one or more embodiments, the instruction when executed by the processor cause the processor to: assign thermal energy loads to the supply device and the consuming device to maintain the temperature within an allowable temperature range based on the model; and operate the energy plant according to the assigned thermal energy loads.

Various embodiments of a system including a controller for an energy plant are disclosed herein. The energy plant includes a loop formed by a plurality of devices. The controller includes a processing circuit comprising a processor and memory storing instructions executed by the processor. The processing circuit is configured to obtain a maximum allowable temperature and a minimum allowable temperature of gas or liquid in the loop. The processing circuit is configured to generate a model indicating a relationship between (i) a temperature of the gas or the liquid in the loop, and (ii) a difference between an induced thermal energy load at a load device of the plurality of devices and a produced thermal energy load produced by a supply device of the plurality of devices. The processing circuit is configured to generate a cost function with a constraint according to the model. The processing circuit is configured to determine control decision values based on the cost function. The processing circuit is configured to operate the energy plant according to the control decision values.

In one or more embodiments, the constraint is to keep the temperature of the gas or the liquid in the loop to be between the maximum allowable temperature and the minimum allowable temperature, when the energy plant operates according to the control decision values.

In one or more embodiments, the control decision values include when to defer the produced load by the supply device and an amount of the produced load.

In one or more embodiments, the cost function corresponds to a total energy consumed by the energy plant.

In one or more embodiments, the control decision values are determined to minimize the cost function, while complying with the constraint.

In one or more embodiments, the processing circuit is configured to generate a regression model of the produced thermal energy load. The processing circuit may be configured to predict the produced thermal energy load produced by the supply device for a first time period based on the regression model. The processing circuit may be configured to determine a heat capacity of gas or liquid in the loop based on the predicted produced thermal energy load. The model may be generated based on the heat capacity.

In one or more embodiments, the processing circuit is configured to obtain load data indicating the produced thermal energy load during a second time period, the second time period before the first time period. The processing circuit may be configured to generate the regression model based on the load data.

In one or more embodiments, the processing circuit is configured to filter the produced thermal energy load during the second time period. The processing circuit may be configured to generate the regression model based on the filtered thermal energy load.

Various embodiments of a method for an energy plant including a loop formed by a plurality of devices are disclosed herein. The method includes obtaining a maximum allowable temperature and a minimum allowable temperature of gas or liquid in the loop. The method includes generating a model indicating a relationship between (i) a temperature of the gas or the liquid in the loop, and (ii) a difference between an induced thermal energy load at a load device of the plurality of devices and a produced thermal energy load produced by a supply device of the plurality of devices. The method includes generating a cost function with a constraint according to the model. The method includes determining control decision values based on the cost function. The method includes operating the energy plant according to the control decision values.

In one or more embodiments, the constraint is to keep the temperature of the gas or the liquid in the loop to be between the maximum allowable temperature and the minimum allowable temperature, when the energy plant operates according to the control decision values.

In one or more embodiments, the control decision values include when to defer the produced load by the supply device and an amount of the produced load.

In one or more embodiments, the cost function corresponds to a total energy consumed by the energy plant.

In one or more embodiments, the control decision values are determined to minimize the cost function, while complying with the constraint.

In one or more embodiments, the method includes generating a regression model of the thermal energy load produced by the supply device. The method may include predicting the produced thermal energy load for a first time period based on the regression model. The method may include determining a heat capacity of gas or liquid in the loop based on the predicted produced thermal energy load. The model may be generated based on the heat capacity.

In one or more embodiments, the method includes obtaining load data indicating the thermal energy load produced during a second time period by the supply device, the second time period before the first time period. The regression model may be generated based on the load data.

In one or more embodiments, the method includes filtering the produced thermal energy load during the second time period. The regression model may be generated based on the filtered thermal energy load.

Various embodiments of a non-transitory computer readable medium storing instructions for an energy plant including a loop formed by a plurality of devices are disclosed herein. The instructions when executed by a processor cause the processor to: obtain a maximum allowable temperature and a minimum allowable temperature of gas or liquid in the loop; generate a model of mass storage, the model indicating a relationship between (i) a temperature of the gas or liquid in the loop, and (ii) a difference between an induced thermal energy load at a load device of the plurality of devices and a produced thermal energy load produced by a supply device of the plurality of devices; generate a cost function with a constraint according to the model; determine control decision values based on the cost function; and operate the energy plant according to the control decision values.

In one or more embodiments, the constraint is to keep the temperature of the gas or the liquid in the loop to be between the maximum allowable temperature and the minimum allowable temperature, when the energy plant operates according to the control decision values.

In one or more embodiments, the control decision values include when to defer the produced load by the supply device and an amount of the produced load.

In one or more embodiments, the cost function corresponds to a total energy consumed by the energy plant, and wherein the control decision values are determined to minimize the cost function, while complying with the constraint.

Various embodiments of a system including a controller for an energy plant are disclosed herein. The energy plant includes a loop formed by a plurality of devices. The controller includes a processing circuit comprising a processor and memory storing instructions executed by the processor. The processing circuit is configured to obtain load data indicating thermal energy load supplied during a first time period by a supply device of the plurality of devices. The processing circuit is configured to predict a thermal energy load consumption during the first time period by a load device of the plurality of devices in the loop. The processing circuit is configured to generate a model of a mass storage of gas or liquid in the loop based on the predicted thermal energy load consumption. The processing circuit is configured to determine an amount of production of the gas or the liquid by the supply device for a second time period according to the model of the mass storage. The second time period may be after the first time period. The processing circuit is configured to operate the energy plant according to the amount of production of the gas or the liquid by the supply device during the second time period.

In one or more embodiments, the processing circuit is configured to generate the model of the mass storage by determining a charge fraction by determining a ratio between: a first difference between a maximum allowable temperature of the gas or the liquid and an operating temperature of the gas or the liquid, and a second difference between the maximum allowable temperature of the gas or the liquid and a minimum allowable temperature of the gas or the liquid.

In one or more embodiments, the processing circuit is configured to receive the maximum allowable temperature and the minimum allowable temperature through a user interface, and receive a sensed temperature of the gas or the liquid in the loop as the operating temperature of the gas or the liquid.

In one or more embodiments, the processing circuit is configured to determine a heat capacity of the gas or the liquid based on the predicted thermal energy load consumption.

In one or more embodiments, the processing circuit is configured to generate the model of the mass storage by determining a charge rate by multiplying the heat capacity by a rate of temperature increase of the gas or the liquid in the loop.

In one or more embodiments, the processing circuit is configured to generate the model of the mass storage by determining an energy capacity of the model of the mass storage by multiplying the heat capacity by an allowable temperature range of the gas or the liquid in the loop.

In one or more embodiments, the processing circuit is configured to filter the thermal energy load supplied by the supply device, and predict a non-zero thermal energy load supplied when the supply device is turned off in the first time period based on the filtered thermal energy load.

In one or more embodiments, the thermal energy load consumption during the first time period is a non-zero thermal energy load consumption of the load device. The processing circuit is configured to predict the non-zero thermal energy load consumption of the load device when the supply device is turned off based on the non-zero thermal energy load supplied.

In one or more embodiments, the processing circuit is configured to determine a third time period, during which the supply device is tuned off. The third time period may be within the first time period. The processing circuit may be further configured to predict a non-zero thermal energy load consumption of the load device during the third time period by filtering the thermal energy load supplied by the supply device during the third time period.

Various embodiments of a method for an energy plant are disclosed herein. The energy plant includes a loop formed by a plurality of devices. The method includes obtaining load data indicating thermal energy load supplied during a first time period by a supply device of the plurality of devices. The method includes predicting a thermal energy load consumption during the first time period by a load device of the plurality of devices in the loop. The method includes generating a model of a mass storage of gas or liquid in the loop based on the predicted thermal energy load consumption. The method includes determining an amount of production of the gas or the liquid by the supply device for a second time period according to the model of the mass storage, the second time period after the first time period. The method includes operating the energy plant according to the amount of production of the gas or the liquid by the supply device during the second time period.

In one or more embodiments, generating the model of the mass storage includes determining a charge fraction of the model of the mass storage by determining a ratio between: a first difference between a maximum allowable temperature of the gas or the liquid and an operating temperature of the gas or the liquid, and a second difference between the maximum allowable temperature of the gas or the liquid and a minimum allowable temperature of the gas or the liquid.

In one or more embodiments, the method includes receiving the maximum allowable temperature and the minimum allowable temperature through a user interface; and receiving a sensed temperature of the gas or the liquid in the loop as the operating temperature of the gas or the liquid.

In one or more embodiments, the method includes determining a heat capacity of the gas or the liquid based on the predicted thermal energy load consumption.

In one or more embodiments, generating the model of the mass storage includes determining a charge rate of the model of the mass storage by multiplying the heat capacity by a rate of temperature increase of the gas or the liquid in the loop.

In one or more embodiments, generating the model of the mass storage includes determining an energy capacity of the model of the mass storage by multiplying the heat capacity by an allowable temperature range of the gas or the liquid in the loop.

In one or more embodiments, the method further includes filtering the thermal energy load supplied by the supply device, and predicting a non-zero thermal energy load supplied when the supply device is turned off in the first time period based on the filtered thermal energy load.

In one or more embodiments, the thermal energy load consumption during the first time period is a non-zero thermal energy load consumption of the load device. The non-zero thermal energy load consumption of the load device may be predicted based on the non-zero thermal energy load supplied.

In one or more embodiments, the method includes determining a third time period, during which the supply device is tuned off. The third time period may be within the first time period. The method may further include predicting a non-zero thermal energy load consumption of the load device during the third time period by filtering the thermal energy load supplied by the supply device during the third time period.

Various embodiments of a non-transitory computer readable medium storing instructions for an energy plant are disclosed herein. The energy plant includes a loop formed by a plurality of devices. The instructions when executed by a processor cause the processor to: obtain load data indicating thermal energy load supplied during a first time period by a supply device of the plurality of devices; predict a thermal energy load consumption during the first time period by a load device of the plurality of devices in the loop; generate a model of a mass storage of gas or liquid in the loop based on the predicted thermal energy load consumption; determine an amount of production of the gas or the liquid by the supply device for a second time period according to the model of the mass storage, the second time period after the first time period; and operate the energy plant according to the amount of production of the gas or the liquid by the supply device during the second time period.

In one or more embodiments, the thermal load energy load consumption of the load device during the first time period is a non-zero thermal energy load consumption. The instructions when executed by the processor may further cause the processor to: filter the thermal energy load supplied by the supply device, and predict the non-zero thermal energy load consumption of the load device during the first time period based on the filtered thermal energy load.

Various embodiments of a controller for an energy plant are disclosed herein. The energy plant includes a loop formed by a plurality of devices. The controller includes a processing circuit comprising a processor and memory storing instructions executed by the processor, the processing circuit configured to: obtain a charge rate, a discharge rate, and an energy capacity of a water mass storage in the loop during a first time period, predict a change in a temperature of gas or liquid in the loop during a second time period based on the charge rate, the discharge rate, and the energy capacity of the water mass storage in the loop, the second time period after the first time period, and adjust a thermal energy load consumed by a load device of the plurality of devices during the second time period, according to the predicted change in the temperature of the gas or the liquid.

In one or more embodiments, the processing circuit is configured to adjust the thermal energy load consumed by the load device to control the temperature of the gas or the liquid in the loop to be within an allowable temperature range.

In one or more embodiments, the processing circuit is configured to determine an effective thermal mass of the gas or the liquid in the loop during the first time period. The processing circuit may be configured to obtain the charge rate, the discharge rate, and the energy capacity of the water mass storage based on the effective thermal mass.

In one or more embodiments, the processing circuit is configured to determine the effective thermal mass of the gas or the liquid in the loop by predicting a thermal energy load consumption during the first time period by the load device, and determining the effective thermal mass of the gas or the liquid in the loop based on the thermal energy load consumption.

In one or more embodiments, the processing circuit is configured filter a thermal energy load supplied by a supply device of the plurality of devices in the loop, and predict a non-zero thermal energy load supplied when the supply device is turned off in the first time period based on the filtered thermal energy load.

In one or more embodiments, the thermal energy load consumption during the first time period is a non-zero thermal energy load consumption of the load device. The processing circuit may be configured to predict the non-zero thermal energy load consumption of the load device when the supply device is turned off based on the non-zero thermal energy load supplied.

In one or more embodiments, the processing circuit is configured to predict an amount of production of the gas or the liquid in the loop during the second time period based on the effective thermal mass. The change in the temperature of the gas or the liquid in the loop may be predicted based on the predicted amount of production of the gas or the liquid in the loop.

Various embodiments of a method for an energy plant are disclosed herein. The energy plant includes a loop formed by a plurality of devices. The method includes obtaining a charge rate, a discharge rate, and an energy capacity of a water mass storage in the loop during a first time period. The method includes predicting a change in a temperature of gas or liquid in the loop during a second time period based on the charge rate, the discharge rate, and the energy capacity of the water mass storage in the loop, the second time period after the first time period. The method includes adjusting a thermal energy load consumed by a load device of the plurality of devices during the second time period, according to the predicted change in the temperature of the gas or the liquid.

In one or more embodiments, adjusting the thermal energy load consumed by the load device includes controlling the temperature of the gas or the liquid in the loop to be within an allowable temperature range.

In one or more embodiments, the method further includes determining an effective thermal mass of the gas or the liquid in the loop during the first time period. The charge rate, the discharge rate, and the energy capacity of the water mass storage may be obtained based on the effective thermal mass.

In one or more embodiments, determining the effective thermal mass of the gas or the liquid in the loop includes predicting a thermal energy load consumption during the first time period by the load device, and determining the effective thermal mass of the gas or the liquid in the loop based on the thermal energy load consumption.

In one or more embodiments, the method further includes filtering a thermal energy load supplied by a supply device of the plurality of devices in the loop, and predicting a non-zero thermal energy load supplied when the supply device is turned off in the first time period based on the filtered thermal energy load.

In one or more embodiments, the thermal energy load consumption during the first time period is a non-zero thermal energy load consumption of the load device. The method may further include predicting the non-zero thermal energy load consumption of the load device when the supply device is turned off based on the non-zero thermal energy load supplied.

In one or more embodiments, the method further includes predicting an amount of production of the gas or the liquid in the loop during the second time period based on the effective thermal mass. The change in the temperature of the gas or the liquid in the loop may be predicted based on the predicted amount of production of the gas or the liquid in the loop.

Various embodiments of a non-transitory computer readable medium comprising instructions for an energy plant are disclosed herein. The energy plant includes a loop formed by plurality of devices. The instructions when executed by a processor cause the processor to: obtain a charge rate, a discharge rate, and an energy capacity of a water mass storage in the loop during a first time period; predict a change in a temperature of gas or liquid in the loop during a second time period based on the charge rate, the discharge rate, and the energy capacity of the water mass storage in the loop, the second time period after the first time period; and adjust a thermal energy load consumed by a load device of the plurality of devices during the second time period, according to the predicted change in the temperature of the gas or the liquid.

In one or more embodiments, the instructions when executed by the processor to adjust the thermal energy load consumed by the load device further cause the processor to control the temperature of the gas or the liquid in the loop to be within an allowable temperature range.

In one or more embodiments, the instructions when executed by the processor further cause the processor to determine an effective thermal mass of the gas or the liquid in the loop during the first time period. The charge rate, the discharge rate, and the energy capacity of the water mass storage may be obtained based on the effective thermal mass.

In one or more embodiments, the instructions when executed by the processor to determine the effective thermal mass of the gas or the liquid in the loop further cause the processor to predict a thermal energy load consumption during the first time period by the load device, and determine the effective thermal mass of the gas or the liquid in the loop based on the thermal energy load consumption.

In one or more embodiments, the instructions when executed by the processor further cause the processor to filter a thermal energy load supplied by a supply device of the plurality of devices in the loop, and predict a non-zero thermal energy load supplied when the supply device is turned off in the first time period based on the filtered thermal energy load.

In one or more embodiments, the thermal energy load consumption during the first time period is a non-zero thermal energy load consumption of the load device. The instructions when executed by the processor further cause the processor to predict the non-zero thermal energy load consumption of the load device when the supply device is turned off based on the non-zero thermal energy load supplied.

Various embodiments of a controller for an energy plant are disclosed herein. The controller includes a processing circuit configured to obtain load data indicating the thermal energy load supplied by a supply device of the plurality of devices during a first time period. The controller may be configured to obtain the temperature of the liquid or gas in the loop during a first time period. The controller may be configured to use load supplied data when the temperature of the liquid or gas remains constant during the first time period to predict the induced load at a consuming device when the temperature is not constant. The controller may be configured to compare the predicted induced load, the supplied load, and the temperature to develop a model that describes how the difference between the induced load and the supplied load affects the temperature. The controller may be configured to use the model to control the equipment such that the temperature stays between a max and min temperature.

In one or more embodiments, the model that describes how the difference between the induced load and the supplied load affects the temperature is represented by a single thermal mass term.

In one or more embodiments, the controller is configured to filter at least one of the thermal energy load supplied and the temperature of the liquid or gas.

In one or more embodiments, the controller is configured to estimate an induced load during the first time period by: measuring the temperature, using the temperature to estimate an induced load not supplied, and summing the supplied load and the load not supplied.

In one or more embodiments, the estimates of the induced load during the first time period may be used to develop a prediction model of the induced load.

In one or more embodiments, the controller is configured to predict the induced load during a second time period by: measuring the temperature during a period prior to the second time period, using the temperature to estimate a current load not supplied, and summing the current supplied load and the current load not supplied to calculate a current induced load.

Various embodiments of a controller for an energy plant are disclosed herein. The controller may be configured to obtain a max/min temperature for the liquid or gas temperature. The controller may be configured to obtain a model for how the temperature changes as function of the difference between the induced load and the supplied load. The controller may be configured to add a decision variable to the optimization problem representing the temperature of the gas or liquid. The controller may be configured to add a constraint to the optimization problem such that the temperature evolves over time following the model for how the temperature changes as a function of the difference between the induced load and supplied load. The controller may be configured to minimize the cost function to obtain the control decisions and the target temperature over the time horizon. The controller may be configured to control the equipment using the optimal control decisions.

Various embodiments disclosed herein are related to a non-transitory computer readable medium storing instructions when executed by a processor cause the processor to perform any process or a method described herein.

DETAILED DESCRIPTION

Overview

Referring generally to the FIGURES, disclosed herein are systems and methods for operating the HVAC system by predicting load of a thermal energy storage of the HVAC system.

Various embodiments of a system, a method, and a non-transitory computer readable medium for operating an energy plant are disclosed herein. The energy plant may include a supply device and a load device forming a loop. The supply device may provide water or gas to the load device, and the load device may consume the provided water or gas. In one aspect, the system obtains load data indicating thermal energy load supplied during a first time period by a supply device of the plurality of devices. The system predicts a thermal energy load consumption during the first time period by the load device. The system generates a model of a mass storage of gas or liquid in the loop based on the predicted thermal energy load consumption. The system determines an amount of production of the gas or the liquid by the supply device for a second time period according to the model of the mass storage. The second time period may be after the first time period. The system operates the energy plant according to the amount of production of the gas or the liquid by the supply device during the second time period.

In some embodiments, the system obtains a charge rate, a discharge rate, and an energy capacity of a water mass storage in the loop during a first time period. The system predicts a change in a temperature of gas or liquid in the loop during a second time period based on the charge rate, the discharge rate, and the energy capacity of the water mass storage in the loop. The second time period may be after the first time period. The system adjusts a thermal energy load consumed by a load device of the plurality of devices during the second time period, according to the predicted change in the temperature of the gas or the liquid.

Advantageously, the model of the mass storage (e.g., water mass storage) and identifying the heat capacity of the water mass allow more accurate prediction of load. Moreover, the model of the mass storage may be employed as an energy storage element, allowing the secondary return water temperature to be controlled to reduce an electric demand cost and other resources.

Building and HVAC System

Figure 1:
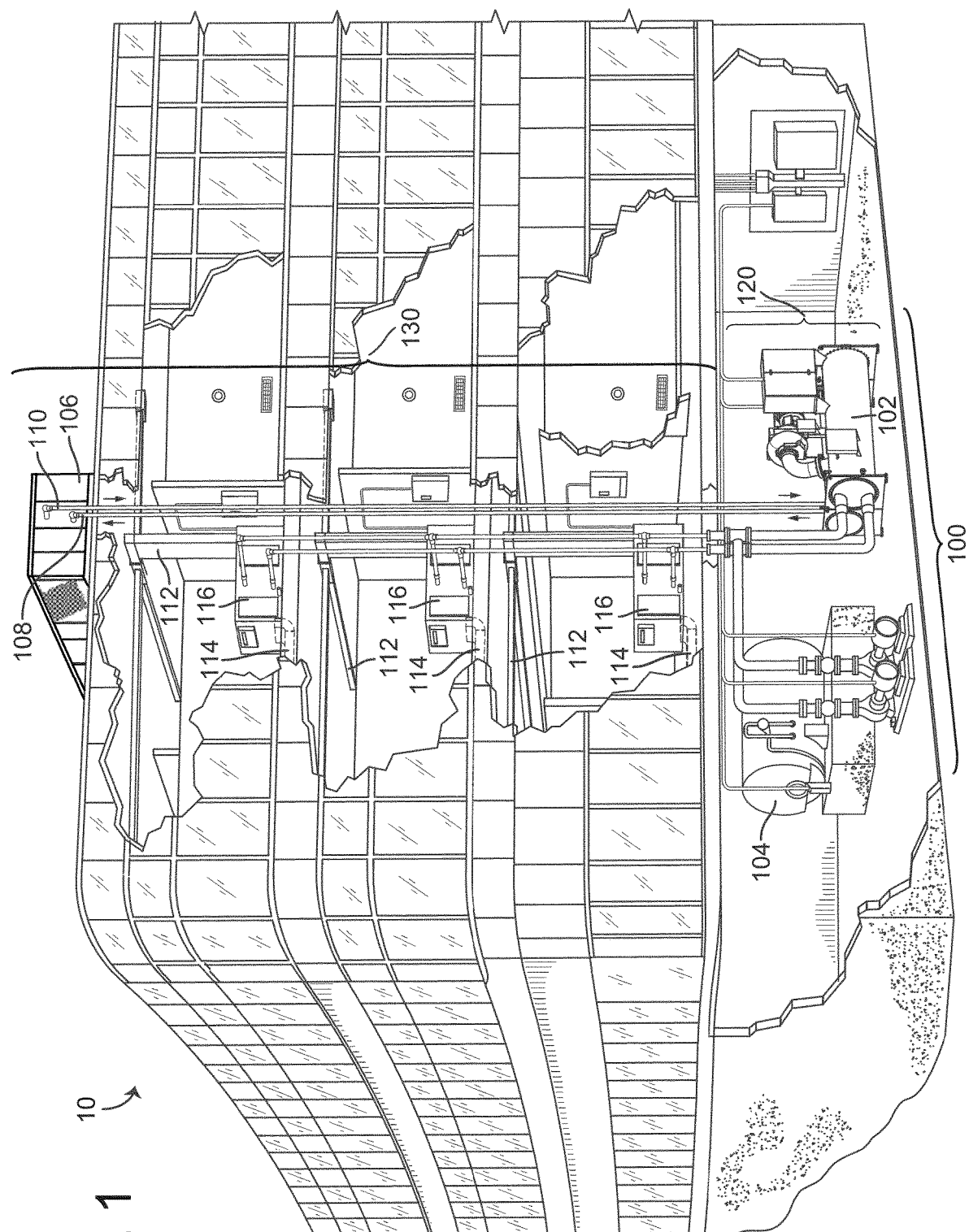
FIG. 1 is a drawing of a building equipped with an HVAC system, according to some embodiments.
Figure 2:
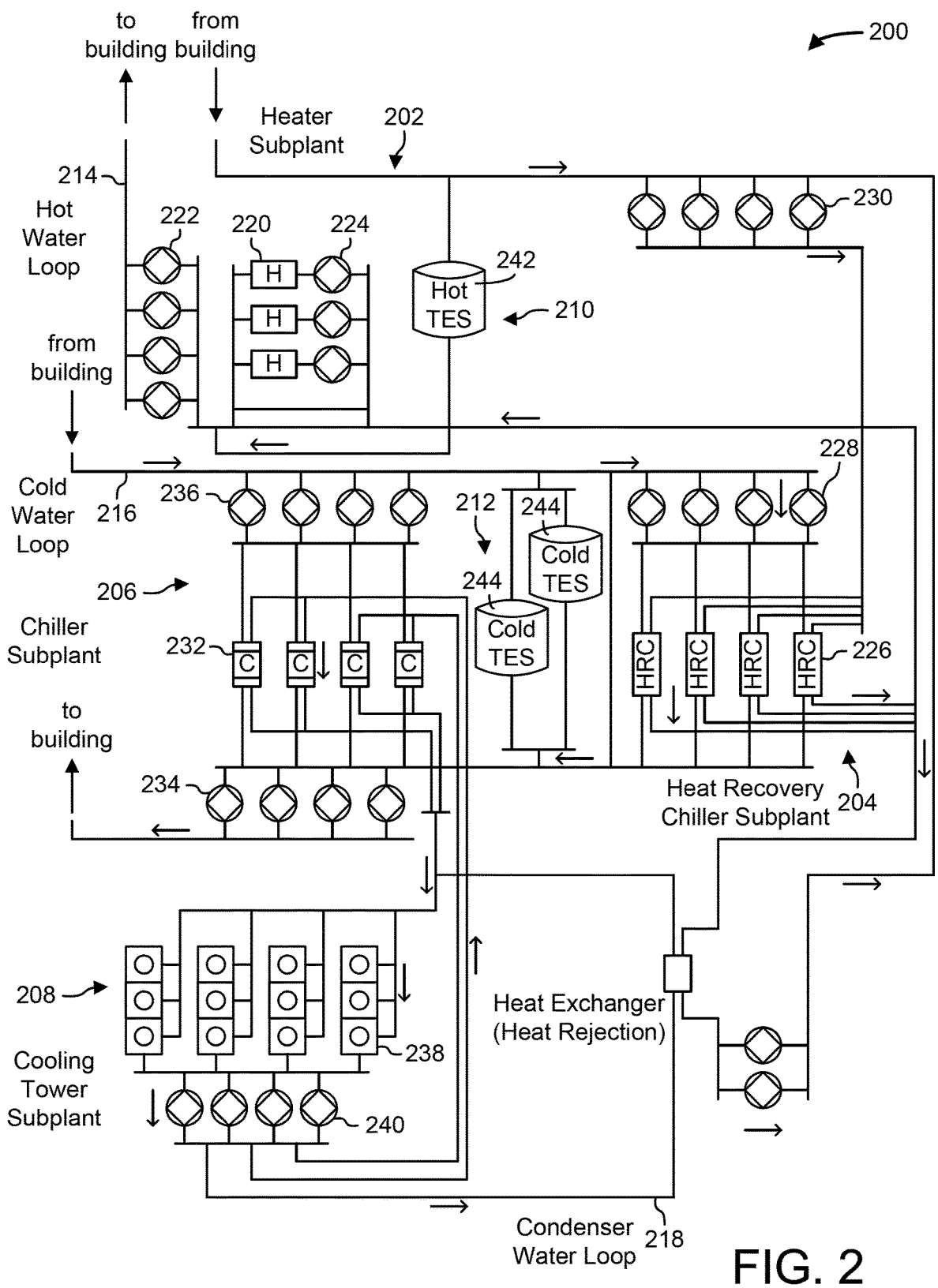
FIG. 2 is a schematic of a waterside system, which can be used as part of the HVAC system of FIG. 1, according to some embodiments.
Figure 3:
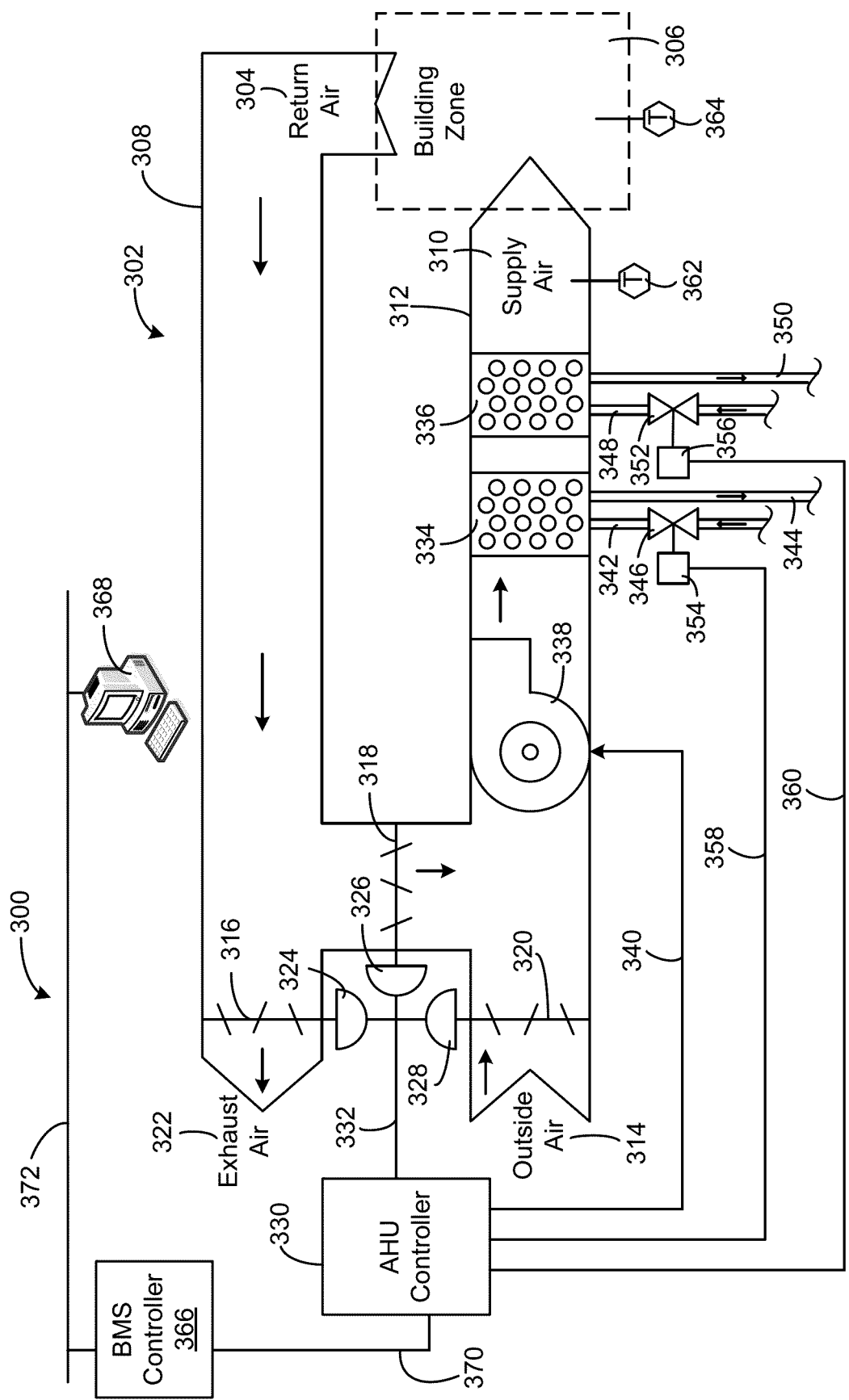
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator

356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
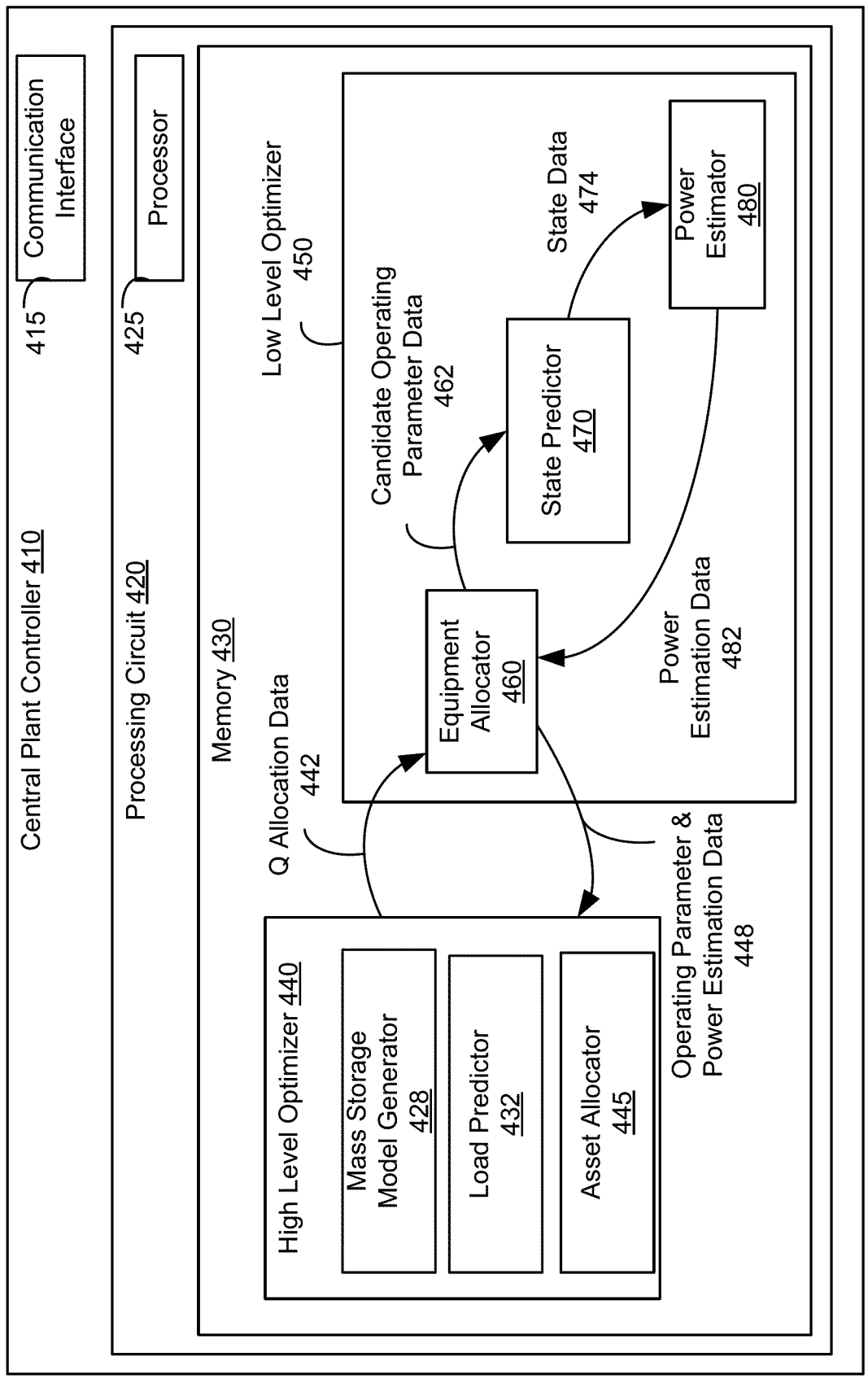
FIG. 4 is a block diagram of a central plant controller which can be used to control the HVAC system of FIG. 1, the waterside system of FIG. 2, and/or the airside system of FIG. 3, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440, and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes a mass storage model generator 428, a load predictor 432, and an asset allocator 445. These components operate together to generate a model of mass storage, and distribute thermal energy load according to the model of mass storage to operate the HAVC system accordingly. In some embodiments, the high level optimizer 440 includes additional, fewer, or different components than shown in FIG. 4.

The mass storage model generator 428 is a component that generates a model of mass storage (e.g., water mass storage). A model of mass storage (e.g., water mass storage) may correspond to a difference between a thermal energy load of a supply device and a thermal energy load of a load device in a loop. In one aspect, the model of mass storage models cooling discharged. A model of the mass storage may be generated according to characteristics such as a charge fraction, energy capacity, a charge rate, and a discharge rate. The mass storage model generator 428 may automatically determine the model of the mass storage based on heat capacity, a maximum allowable temperature and a minimum allowable temperature. The heat capacity may be automatically determined from a load data indicating thermal energy load supplied by a supply device (e.g., chiller device), and estimating a load consumption by a load device. A maximum allowable temperature and a minimum allowable temperature may be predetermined or provided by a user through a user interface. By automatically generating the model of the mass storage as disclosed herein, a user may enter a few values (e.g., a maximum allowable temperature and a minimum allowable temperature) to obtain an accurate model of mass storage, without manually determining complex characteristics of a charge fraction, energy capacity, a charge rate, and a discharge rate. Detailed example processes of generating and applying the model of mass storage are provided below with respect to FIGS. 5 through 8.

The load predictor 432 is a component that determines a thermal energy load of a mass storage of the HVAC system. In one aspect, the load predictor 432 obtains load data indicating thermal energy load supplied by a supply device (e.g., chiller device). Such load data may be obtained by sensors coupled to the AHU controller 330 and BMS controller 366 of FIG. 3. The load predictor 432 generates predicted load data indicating an estimated thermal energy load consumption by a load device. In one aspect, the load of mass storage corresponds to a difference between the thermal energy load supplied by the supply device and the estimated thermal energy load consumption by the load device. According to the load of mass storage, characteristics of a mass storage model can be determined. Detailed example process of predicting load of a thermal energy storage based on the water mass model is provided below with respect to FIGS. 5 through 8.

The asset allocator 445 determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{\ell}_k$ and utility rate information received through a user input or automatically determined by a scheduler (not shown), the asset allocator 445 may determine a distribution of the predicted thermal energy load $\hat{\ell}_k$ across plants to minimize the cost. The asset allocator 445 generates the Q allocation data 442 indicating the predicted loads $\hat{\ell}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization performed by the high level optimizer 440 may be different from the low level optimization performed by the low level optimizer 450 in that the high level optimization has a longer time constant due to the thermal energy storage provided by TES subplants. The high level optimization may be described by the following equation:

$$\theta_{HL}^* = \underset{\theta_{HL}}{\mathrm{argmin}} J_{HL}(\theta_{HL}) \qquad \text{Eq. (1)}$$

where $\theta^*_{HL}$ contains the optimal high level decisions (e.g., the optimal load $\dot{Q}$ for each of subplants) for the entire prediction period and $J_{HL}$ is the high level cost function.

To find the optimal high level decisions $\theta^*_{HL}$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \Sigma_{k=1}^{n_h} \Sigma_{i=1}^{n_s} [\Sigma_{j=1}^{n_u} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \underset{n_h}{\max}(u_{elec}(\theta_{HL}), u_{max,ele}) \qquad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., capacities) of the HVAC devices of the HVAC system 100. In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of thermal energy loads indicated by the Q allocation data 442, and generate operating parameter data indicating the determined set of operating parameters. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

Figure 5:
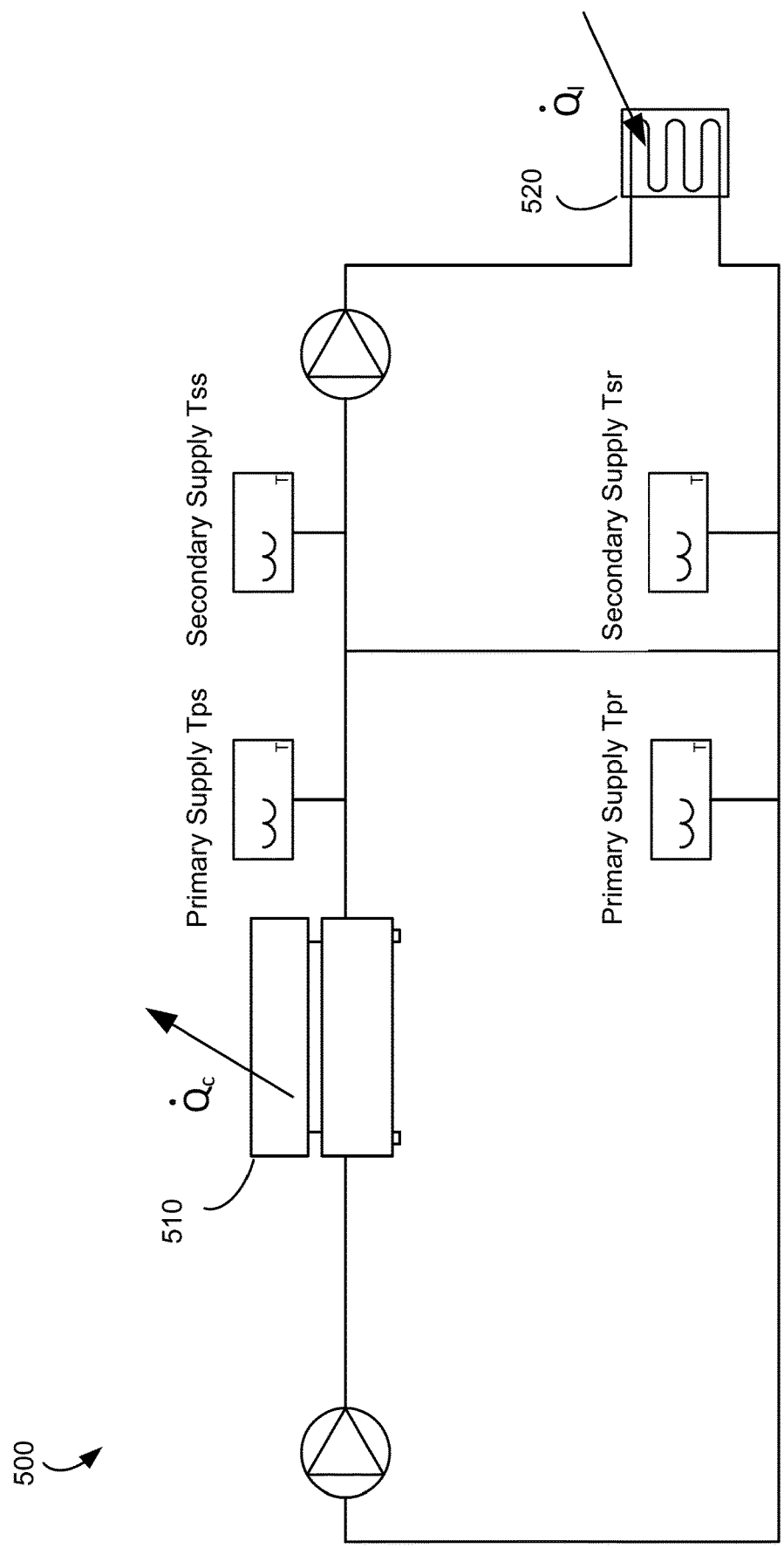
FIG. 5 is a schematic representation of an HVAC system, according to some embodiments.

Referring to FIG. 5, illustrated is a schematic representation 500 of an HVAC system, according to some embodiments. In FIG. 5, the supply device 510 (e.g., chiller) and the load device 520 (e.g., load coil) may forma loop. In this configuration, the supply device 510 supplies gas or liquid, and the load device 520 consumes the gas or liquid for controlling temperature of a space.

During periods of low load, thermal energy storages (e.g., chillers) are often cycled to meet the cooling loads of the connected buildings. A chiller may be shut off once the chilled water temperature reaches set point or a low threshold value (e.g., 40° F.) and the chiller may operate at the minimum load. The chiller then may be left off until the return water temperature reaches a high threshold value (e.g., 55° F.). Such fixed rule based system according to fixed lower limit and upper limit of temperature thresholds may be inefficient.

Instead of a fixed rule based method, the central plant controller 410 may dynamically set bounds on the chilled water temperature, determine the effective thermal mass of the water in the loop, and predict the increase or decrease in temperature based on the under or over production of chilled water dynamically. The central plant controller 410 can then keep the temperature within the bounds and use the storage to produce a behavior similar to the chiller cycling based on temperatures as well as use the additional storage for trimming the demand to reduce the demand charge.

Looking at the temperature from bulk model point of view, the bulk water temperature should follow a differential equation, $$mc_p \dot{T} = \dot{Q}_l - \dot{Q}_c \qquad \text{Eq. (4)}$$

where m is the aggregate mass (or an effective thermal mass) of the water, and $c_p$ is the specific heat capacity of water. In the form of an energy balance, this can be rearranged as:

$$0 = \dot{Q}_l - \dot{Q}_c - mc_p \dot{T} \qquad \text{Eq. (5)}$$

$$0 = \dot{Q}_l - \dot{Q}_c - \dot{Q}_{wss} \qquad \text{Eq. (6)}$$

where $\dot{Q}_{wss}$ is the amount of "cooling discharged" from the water mass storage by allowing the temperature to increase. $\dot{Q}_{wss}$ may be also referred to as "a deferred load" or "an induced load but not supplied." From Eq. (6), the water mass storage acts as a standard storage element from a high level point of view.

The temperature T is meant to bean aggregate or bulk average temperature of all the water in the loop. Because the supply temperatures would change quickly when the chiller is turned on, they cannot be used in the calculation of T. Also, when the chiller and primary pumping is off, the primary return temperature will not see significant flow and should not also be used in the calculation of T. The temperature that can be used is the secondary return water temperature. This value is also filtered by the coils throughout the loop. In the case where several chillers supply the same loop, the aggregate temperature can be the weighted average of all the secondary return temperatures in the loop.

The aggregate mass of the water in the loop may not be known. Under the assumption of the water mass thermodynamics shown in Eq. (4) and with the aggregate temperature T=Tsr defined, the bulk mass or effective thermal mass m can be found using historical data of secondary return temperatures and chilled water production. In the case where building load data is available, the water mass can be estimated by approximating the derivative of the secondary return temperature using a forward finite difference and using linear regression to find the best fit of Eq. (7). The data used is that where the return water temperature is in a transient state, $$mc_p \frac{(T_{sr,k} - T_{sr,k-1})}{\Delta t} = \dot{Q}_l - \dot{Q}_c \qquad \text{Eq. (7)}$$

where $T_{sr,k}$ is the secondary return temperature at kth sample (or kth time slot).

Often, building load data may not available (no building load meters), and only historical chiller production and secondary return temperatures may be available. Transient return water temperatures may be utilized for estimating the water mass. During those periods, the chillers may be turned off. Thus, the central plant controller 410 may predict the load while the chillers are turned off.

During steady-state conditions, the contribution of the water mass storage is zero and the measured production (flow times ΔT) is equal to the load, $$\dot{Q}_c = \dot{Q}_l \rightarrow \dot{m}c_p(T_{ps} - T_{pr}) = \dot{Q}_l \quad \text{Eq. (8)}$$

where $T_{ps}$ is the primary supply temperature and $T_{pr}$ is the primary return temperature.

Using data from steady-state operation, the central plant controller 410 (e.g., load predictor 432) develops a predictor $\hat{\dot{Q}}_l$ of the load as a function of the time of day, day of week, and outside air temperature (or enthalpy).

$$\hat{\dot{Q}}_l = f(T_{OA}, t) \quad \text{Eq. (9)}$$

In one aspect, the predictor $\hat{\dot{Q}}_l$ of the load determined during the steady-state temperature condition may be applied to determine deferred load $\dot{Q}_{wss}$ and thermal mass m during the non-steady state temperature condition. Instead of using data steady-state temperature conditions, the central plant controller 410 can apply a Golay filter to the production data to smooth out any transients when the temperature is changing, and determine the predictor $\hat{\dot{Q}}_l$ using the filtered data. At times when the secondary return temperature is not at a steady-state, the chilled water production can be subtracted from the estimated load to produce an estimate of the heat flow from the water mass storage.

$$mc_p \frac{(T_{sr,k} - T_{sr,k-1})}{\Delta t} = f(T_{OA}, t) - \dot{Q}_c \quad \text{Eq. (10)}$$

With the estimate of the load, the heat capacity $mc_p$ can be estimated using linear regression by finding the best fit of Eq. (10) when the return water temperature is not constant.

Figure 6:
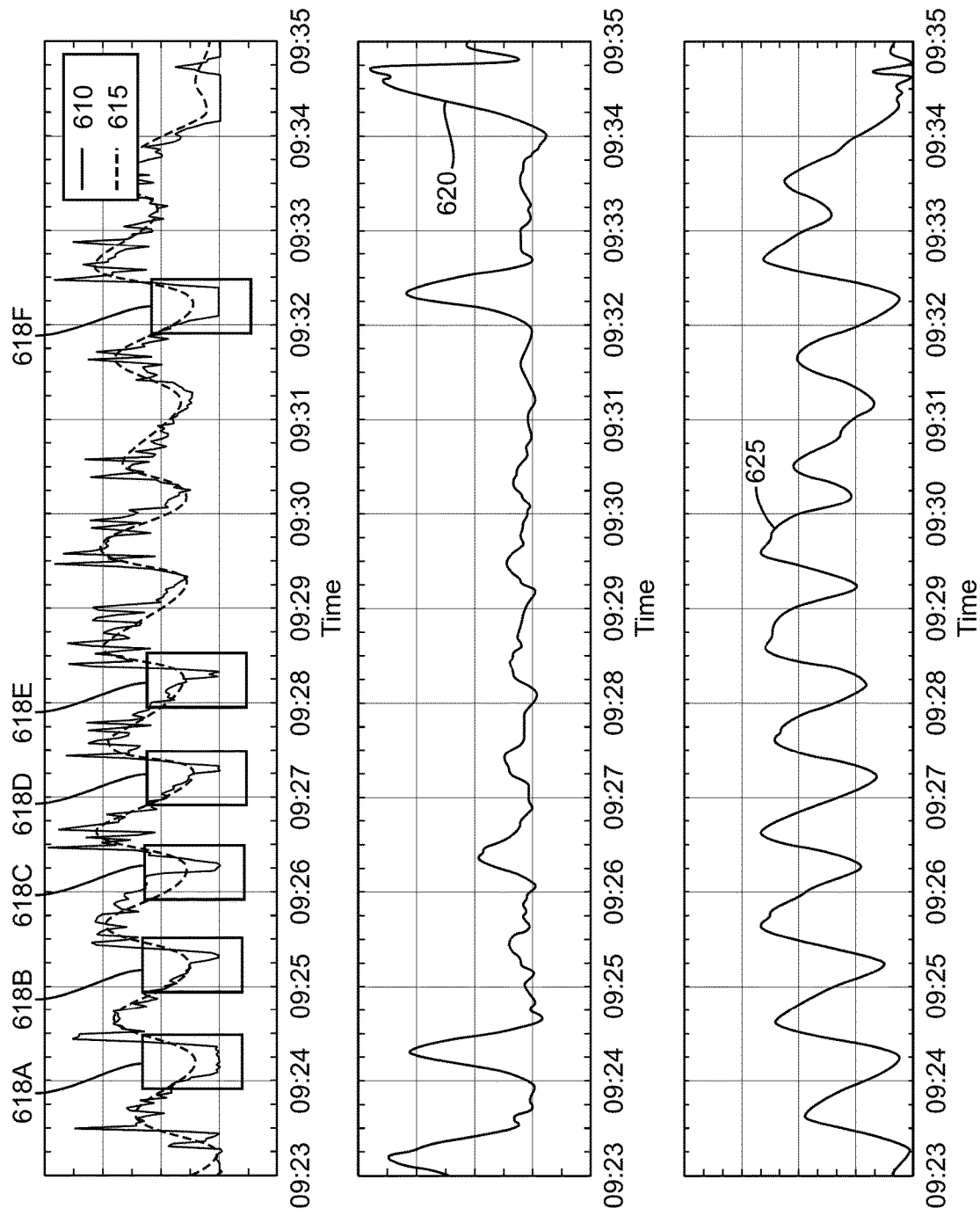
FIG. 6 is an example timing diagram of predicting an estimated load consumption by a load device of an HVAC system, according to some embodiments.

Referring to FIG. 6, illustrated is an example timing diagram of predicting an estimated load consumption by a load device of an HVAC system, according to some embodiments. In FIG. 6, a plot 610 illustrates a thermal energy load produced by a supply device (e.g., chiller). The plot 610 may be generated based on load data from a sensor coupled to a supply device. The plot 615 illustrates a filtered result of the thermal energy load produced by the supply device. The filtered result may be a regression model of the thermal energy load produced by the supply device. In one aspect, the supply device may be disabled or turned off during time periods 618A, 618B, 618C . . . 618F. The load predictor 432 may apply filter to the load data such that a non-zero thermal energy load produced can be predicted as indicated by the plot 615 during the time periods 618A, 618B, 618C . . . 618F. The load predictor 432 may also obtain temperature of secondary return water as indicated by the plot 620. The temperature may be measured by a sensor coupled to the supply device. Based on the filtered result and the temperature of the secondary return water, the load predictor 432 may obtain an estimated load consumption by a load device as indicated by the plot 625.

The mass storage model generator 428 generates a model of mass storage (e.g., water mass storage). The estimate of the water mass and the model of the dynamics of the water mass allows generation of historical load data, even when the load is not directly measured.

Furthermore, with the mass known, the water mass of the loop can now be defined as energy storage element in the optimization problem. The energy capacity of the water mass storage can be found by taking the difference between the maximum and minimum allowable return water temperature and multiplying by the heat capacity $mc_p$, $$C_{wss} = mc_p(T_{sr,max} - T_{sr,min}) \quad \text{Eq. (11)}$$

where $C_{wss}$ is an energy capacity of water mass storage. The range of return water temperatures $T_{sr,max} - T_{sr,min}$ may be predetermined or manually entered by a user.

The state of charge of the water mass storage or the charge fraction estimate is the amount of charge left in the storage element divided by the total state of charge. For the case of simple water mass storage, charge fraction may be determined as followed.

$$\text{charge fraction} = Q_{wss}/C_{wss} = \frac{mc_p(T_{sr,max} - T_{sr,k})}{mc_p(T_{sr,max} - T_{sr,min})} = \frac{(T_{sr,max} - T_{sr,k})}{(T_{sr,max} - T_{sr,min})} \quad \text{Eq. (12)}$$

The maximum charge and discharge rate of the water mass storage would be dependent on several factors including: the connected coils (and the resultant aggregate coil model), the current water temperature, the supply air temperature of the connected coils, etc. The maximum charge/discharge rates of the coil may be difficult to measure. In one aspect, the expected maximum and minimum change in return water temperature may be predefined or manually entered by a user through a user interface. The mass storage model generator 428 may automatically determine the charge and discharge rates based on the heat capacitance and the expected maximum and minimum change in return water temperature. Additionally, the maximum and minimum charge fractions may be '1' and '0,' respectively.

Given the calculated water mass storage element capacity, charge and discharge rates, and the maximum and minimum charge fractions, the central plant controller 410 can determine when to defer chiller production and when to overproduce by considering the water mass storage. The dispatched charge and discharge rates and state-of-charge over the horizon allows for the calculation of the estimate of the return water temperature over the horizon.

Examples of the design characteristics of the water mass storage include: Charge Fraction, Design Charge Rate, Design Discharge Rate, Energy Capacity, Minimum Charge Fraction, and Maximum Charge Fraction. The characteristics may be determined from the following commissionable input parameters with exemplary units: Heat Capacity, ($mc_p$), [kWh/degC], Maximum allowable Water Temperature, $T_{max}$, [degC], Minimum allowable Water Temperature, $T_{min}$, [degC], Maximum allowable Rate Of Water Temperature Increase, $\dot{T}_{max}^\uparrow$, [degC/s], Maximum allowable Rate Of Water Temperature Decrease, $\dot{T}_{max}^\downarrow$, [degC/s]. The characteristics may be further determined based on the following inputs from the BMS: Secondary Return Water Temperature, $T_{sr}$, [degC].

The design characteristics can be calculated as shown in the following table:

| Water Mass Storage Design Characteristics | Chilled Water Mass Storage | Hot Water Mass Storage |
|---|---|---|
| Charge Fraction | $\frac{(T_{max} - T_{sr})}{(T_{max} - T_{min})}$ | $\frac{(T_{sr} - T_{min})}{(T_{max} - T_{min})}$ |
| Energy Capacity | $(mc_p)(T_{max} - T_{min})$ | $(mc_p)(T_{max} - T_{min})$ |
| Design Charge Rate | $(mc_p)\dot{T}_{max}^{\downarrow}$ | $(mc_p)\dot{T}_{max}^{\uparrow}$ |
| Design Discharge Rate | $(mc_p)\dot{T}_{max}^{\uparrow}$ | $(mc_p)\dot{T}_{max}^{\downarrow}$ |
| Minimum Charge Fraction | 0 | 0 |
| Maximum Charge Fraction | 1 | 1 |
| Allocator (kernel) Output | Chilled Water Mass Storage | Hot Water Mass Storage |
| Secondary Return Water Temperature Estimate | $T_{max} - \overline{SOC} \times (T_{max} - T_{min})$ | $T_{min} + \overline{SOC} \times (T_{max} - T_{min})$ | where $\overline{SOC}$ is a charge fraction.

Although the process described herein are provided with respect to water mass storage, the principles disclosed herein may be applicable to any mass storage of other liquid or gas.

Figure 7:
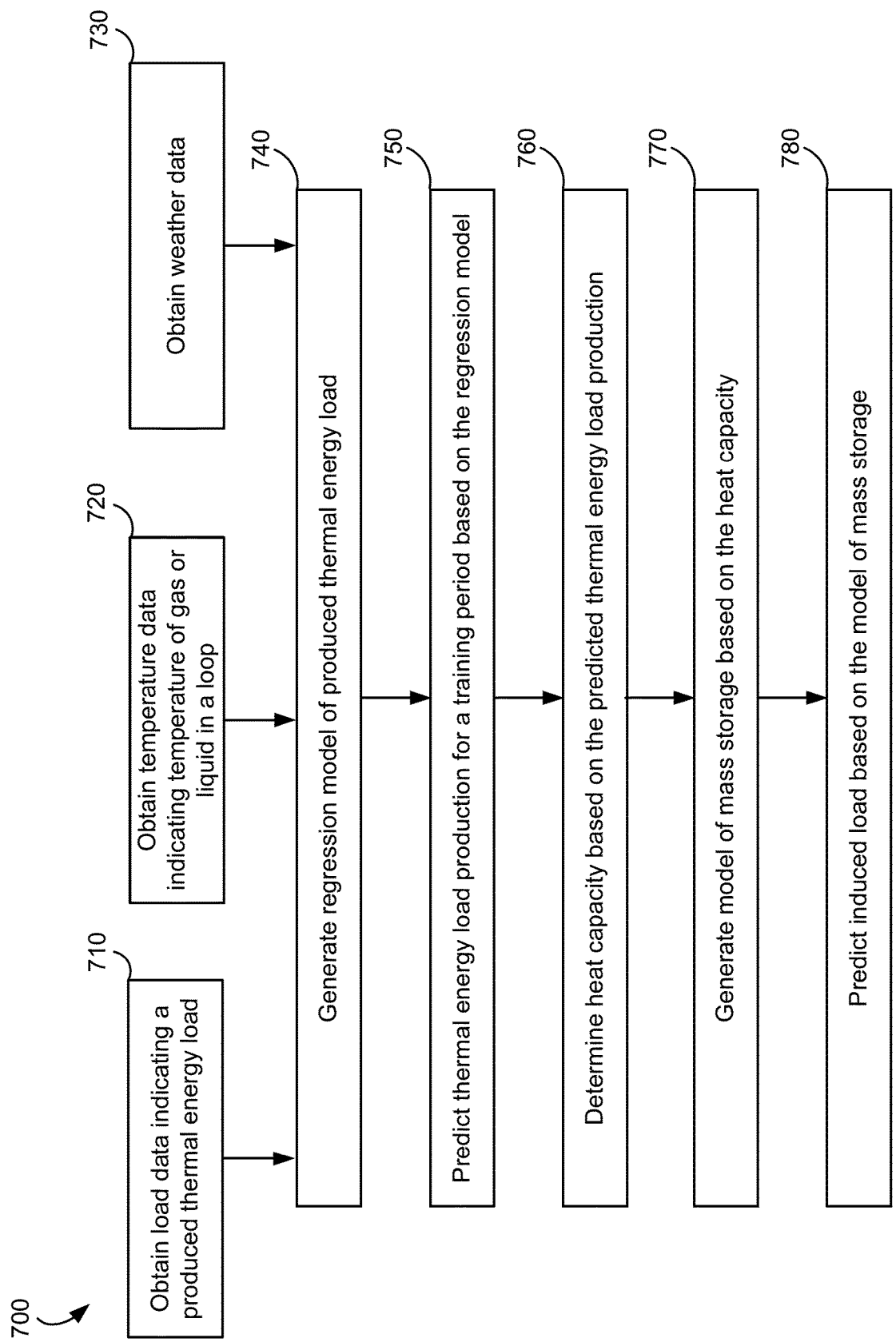
FIG. 7 is a flowchart illustrating a process of operating an energy plant based on a model of mass storage, according to some embodiments.

FIG. 7 is a flow chart illustrating a process 700 of operating an energy plant based on a model of mass storage, according to some embodiments. The process 700 may be performed by the high level optimizer 440 of FIG. 4. In some embodiments, the process 700 may be performed by other entities. In some embodiments, the process 700 may include additional, fewer, or different steps than shown in FIG. 7.

The high level optimizer 440 obtains load data indicating a produced thermal energy load produced by a supply device in a loop (step 710). The supply device may be a chiller producing gas or liquid for consumption by a load device in the loop. The high level optimizer 440 obtains temperature data indicating temperature of gas or liquid in the loop (step 720). The high level optimizer 440 obtains weather data indicating history of weather, for example, near a building, near an energy plant, or a place, at which a climate is controlled by the energy plant (step 730).

The high level optimizer 440 generates a regression model of the produced thermal energy load produced by the supply device (step 740). The regression model may indicate a relationship between a produced load by the supply device, weather, and temperature of gas or liquid in the loop. The high level optimizer 440 may filter the produced thermal energy load to obtain the regression model. The high level optimizer 440 predicts thermal energy load production by the supply device for a training period based on the regression model (step 750).

The high level optimizer 440 determines heat capacity $mc_p$ based on the predicted thermal energy load production (step 760). In one approach, the high level optimizer 440 generates the predictor $\hat{Q}_I$ indicating a predicted load consumed by the load device, and determines the heat capacity $mc_p$ based as described above with respect to Eq. (9) and Eq. (10). In one approach, the high level optimizer 440 determines the predictor $\hat{Q}_I$ according to the produced load $\dot{Q}_c$ produced by the supply device during a steady-state temperature condition, because the temperature difference is zero during the steady-state temperature condition. Moreover, the heat capacity $mc_p$ during a non-steady state temperature condition can be determined by applying the produced load $\dot{Q}_c$ determined in the steady-state temperature condition.

The high level optimizer 440 generates the model of mass storage based on the heat capacity (step 770). Characteristics of the model of mass storage may be determined based on the heat capacity. The characteristics of the model may be also determined based on a user input of a limited number of input parameters. For example, charge fraction, design charge rate, design discharge rate, energy capacity may be determined based on the heat capacity, maximum allowable water temperature, $T_{max}$, minimum allowable water temperature, $T_{min}$, maximum allowable rate of water Temperature Increase, $\dot{T}_{max}^{\uparrow}$, and maximum allowable rate of water temperature decrease, $\dot{T}_{max}^{\downarrow}$.

The high level optimizer 440 predicts induced load of the load device based on the model of mass storage (step 780). For example, the high level optimizer 440 can determine when to defer chiller production and when to overproduce by considering the water mass storage. In one aspect, the high level optimizer 440 may obtain a temperature measurement and a produced thermal energy load for a time period, and apply the temperature measurement and a produced thermal energy load to the Eq. (10) to predict the induced load. In another aspect, the high level optimizer 440 may obtain a predicted temperature measurement and a predicted produced thermal energy load in the future, and apply the predicted temperature measurement and the predicted produced thermal energy load to the Eq. (10) to predict the induced load in the future. The high level optimizer 440 may also predict the induced load of the load device based on a weather forecast.

Figure 8:
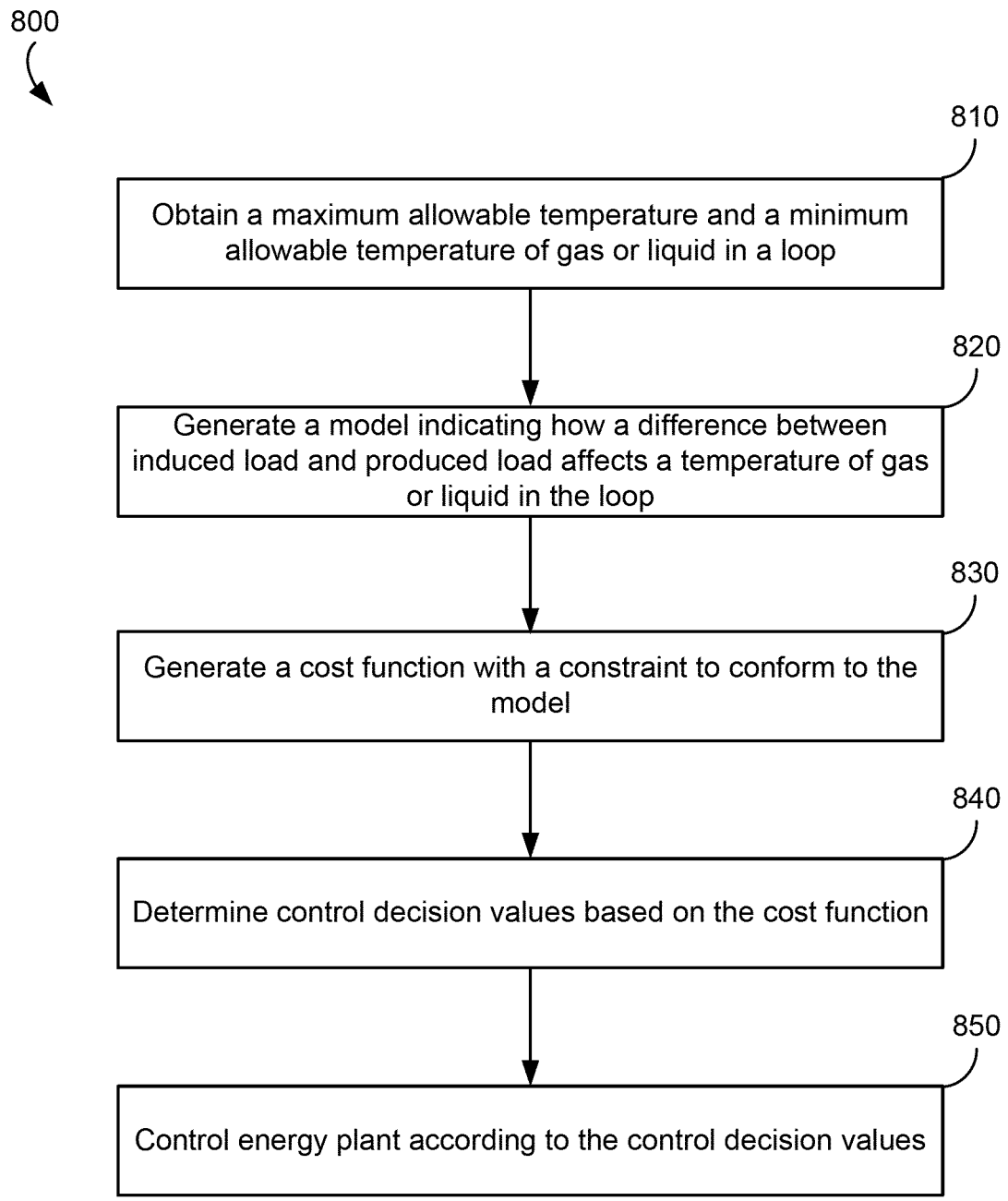
FIG. 8 is a flow chart illustrating another process of operating an energy plant based on a model of mass storage, according to some embodiments.

FIG. 8 is a flow chart illustrating another process 800 of operating an energy plant, according to some embodiments. The process 800 may be performed by the high level optimizer 440 of FIG. 4. In some embodiments, the process 800 may be performed by other entities. In some embodiments, the process 800 may include additional, fewer, or different steps than shown in FIG. 8.

The high level optimizer 440 obtains a maximum allowable temperature and a minimum allowable temperature of gas or liquid in a loop (step 810). The maximum allowable temperature and the minimum allowable temperature of the gas or the liquid may be obtained by a user through a user interface. Alternatively, the maximum allowable temperature and the minimum allowable temperature of the gas or the liquid may be predetermined.

The high level optimizer 440 generates a model indicating how a difference between induced load at the load device and produced load by a supply device affects a temperature of the gas or the liquid in the loop (step 820). For example, the high level optimizer obtains the model as the secondary return water temperature estimate based on the charge fraction $\overline{SOC}$.

The high level optimizer 440 generates a cost function with a constraint to conform to the model (step 830). The constraints may be to maintain the temperature to be within a predetermined range set by the maximum allowable temperature and the minimum allowable temperature.

The high level optimizer 440 determines control decision values based on the cost function (step 840). For example, the high level optimizer 440 determines control decision values by minimizing the cost function while satisfying the constraint. Examples of the control decision values include when to defer the produced load by the supply device and an amount of the produced load. The high level optimizer 440 controls the energy plant according to the control decision values (step 850).

In some embodiments, the high level optimizer 440 obtains load data indicating thermal energy load produced. The load data may be obtained by a sensor coupled to a supply device supplying gas or liquid to a load device in a loop.

In some embodiments the high level optimizer 440 predicts thermal energy load consumption for a first time period by a load device based on the load data. The supply device may be disabled or turned off during a time period within the first time period. In one approach, the high level optimizer 440 applies filtering (e.g., Golay filtering) on the thermal energy produced. The filtered result may render a non-zero thermal energy load produced during the time period. The high level optimizer 440 may obtain temperature data indicating return temperature (e.g., secondary return temperature). Based on the filtered result and the returned temperature, the high level optimizer 440 may predict thermal energy load consumption for the first time period. In some embodiments, the high level optimizer 440 determines the time period, during which supply device is turned off, and applies filtering on the thermal energy produced for the time period.

In some embodiments, the high level optimizer 440 generates a model of mass storage (e.g., water mass storage) based on the predicted thermal energy load consumption. The high level optimizer 440 may determine a heat capacity of gas or liquid in the loop based on the predicted thermal energy load consumption, for example, according to Eq. (10). Based on the heat capacity, the high level optimizer 440 may determine other characteristics of the model of mass storage. Examples of characteristics of the model of mass storage include a charge rate, a discharge rate, and an energy capacity. The high level optimizer 440 may also determine the characteristics of the model of mass storage based on a few number of input parameters. Examples of the parameters include a maximum allowable temperature of the gas or the liquid, a minimum allowable temperature of the gas or the liquid, a maximum allowable rate of increase in temperature of the gas or the liquid, and a minimum allowable rate of increase in temperature of the gas or the liquid. The parameters may be predefined, and/or the high level optimizer 440 may obtain the parameters from a user through a user interface. Based on the characteristics of the model of mass storage, the high level optimizer 440 may automatically generate the model of mass storage.

In some embodiments, the high level optimizer 440 determines an amount of productions of gas or liquid by a supply device based on the model of mass storage. The high level optimizer 440 may determine an amount of production of the gas or the liquid by the supply device for a second time period according to the model of the mass storage. The second time period may be after the first time period.

In some embodiments, the high level optimizer 440 operates the energy plant according to the determined amount of production of gas or liquid.

In some embodiments, the high level optimizer 440 determines an effective thermal mass in a loop. The high level optimizer 440 may obtain load data indicating thermal energy load produced. The high level optimizer 440 may predict thermal energy load consumption for a first time period by a load device based on the load data. The high level optimizer 440 may apply filtering (e.g., Golay filtering) on the thermal energy produced. By filtering the thermal energy load produced, a non-zero thermal energy load produced when the supply device is turned off in the first time period can be predicted. Moreover, the high level optimizer 440 can predict a non-zero thermal energy load consumption of the load device when the supply device is turned off based on the non-zero thermal energy load produced. The high level optimizer 440 may also obtain temperature data indicating return temperature (e.g., secondary return temperature). Based on the filtered result and the returned temperature, the high level optimizer 440 may predict thermal energy load consumption for the first time period. The high level optimizer 440 may determine the effective thermal mass based on the predicted thermal energy load consumption, for example, according to Eq. (10).

In some embodiments, the high level optimizer 440 obtains characteristics of a water mass storage based on the effective thermal mass. The high level optimizer 440 may determine a charge rate, a discharge rate, and an energy capacity of a model of mass storage in the loop during the first time period based on the effective thermal energy mass.

In some embodiments, the high level optimizer 440 predicts a change in temperature of gas or liquid in the loop. In one approach, the high level optimizer 440 predicts an amount of production of gas or liquid in the loop during a second time period based on the effective thermal mass. The second time period may be after the first time period. The high level optimizer 440 may predict a change in temperature of gas or liquid in the loop based on the predicted amount of production of gas or liquid in the loop.

In some embodiments, the high level optimizer 440 adjusts thermal energy load consumed by a load device according to the predicted change in the temperature of gas or liquid. For example, the high level optimizer 440 controls the temperature of the gas or the liquid in the loop to be within an allowable temperature range during the second time period.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant including a loop formed by a plurality of devices, the controller comprising:
 a processing circuit comprising a processor and memory storing instructions executed by the processor, the processing circuit configured to:
  obtain load data indicating a produced thermal energy load produced by a supply device of the plurality of devices during a time period;
  obtain a temperature of gas or liquid in the loop during the time period;
  predict an induced thermal energy load at a consuming device of the plurality of devices during a non-steady state portion of the time period based on the produced thermal energy load during a steady state portion of the time period;
  generate a model indicating a relationship between (i) the temperature of the gas or the liquid in the loop and (ii) a difference between the induced thermal energy load and the produced thermal energy load, based on the predicted induced thermal energy load, the produced thermal energy load, and the temperature; and
  operate the plurality of devices of the energy plant using the model to control the temperature of the gas or the liquid in the loop.

2. The controller of claim 1, wherein:
 the temperature of the gas or the liquid changes beyond a predetermined range during the non-steady state portion, and
 the temperature of the gas or the liquid remains within the predetermined range during the steady state portion.

3. The controller of claim 1, wherein the processing circuit is configured to:
 determine a thermal mass of the gas or the liquid in the loop based on the predicted induced thermal energy load during the non-steady state portion; and
 generate the model based on the thermal mass.

4. The controller of claim 1, wherein the processing circuit is configured to:
 obtain another temperature of the gas or the liquid in the loop during another time period after the time period; and
 predict a deferred load in the loop during the other time period based on the other temperature and thermal mass of the gas or the liquid.

5. The controller of claim 4, wherein the processing circuit is configured to:
 obtain additional load data indicating additional produced thermal energy load produced by the supply device during the other time period; and
 predict an additional induced load at the consuming device during the other time period based on the deferred load and the additional produced thermal energy load during the other time period.

6. The controller of claim 1, wherein the processing circuit is configured to:
 filter one of the produced thermal energy load and the temperature of the gas or the liquid; and
 predict the induced thermal energy load during the non-steady state portion of the time period based on the filtered one of the produced thermal energy load and the temperature of the gas or the liquid.

7. The controller of claim 1, wherein the processing circuit is configured to:
 assign thermal energy loads to the supply device and the consuming device to maintain the temperature within an allowable temperature range based on the model; and
 operate the energy plant according to the assigned thermal energy loads.

8. A method for an energy plant including a loop formed by a plurality of devices, the method comprising:
 obtaining load data indicating a produced thermal energy load produced by a supply device of the plurality of devices during a time period;
 obtaining a temperature of gas or liquid in the loop during the time period;
 predicting an induced thermal energy load at a consuming device of the plurality of devices during a non-steady state portion of the time period based on the produced thermal energy load during a steady state portion of the time period;
 generating a model indicating a relationship between (i) the temperature of the gas or the liquid in the loop and (ii) a difference between the induced thermal energy load and the produced thermal energy load, based on the predicted induced thermal energy load, the produced thermal energy load, and the temperature; and
 operating the plurality of devices of the energy plant using the model to control the temperature of the gas or the liquid in the loop.

9. The method of claim 8, wherein:
 the temperature of the gas or the liquid changes beyond a predetermined range during the non-steady state portion, and
 the temperature of the gas or the liquid remains within the predetermined range during the steady state portion.

10. The method of claim 8, further comprising:
 determining a thermal mass of the gas or the liquid in the loop based on the predicted induced thermal energy load during the non-steady state portion; and
 generating the model based on the thermal mass.

11. The method of claim 8, further comprising:
obtaining another temperature of the gas or the liquid in the loop during another time period after the time period; and
predicting a deferred load in the loop during the other time period based on the other temperature and thermal mass of the gas or the liquid.

12. The method of claim 11, further comprising:
obtaining additional load data indicating additional produced thermal energy load produced by the supply device during the other time period; and
predicting an additional induced load at the consuming device during the other time period based on the deferred load and the additional produced thermal energy load during the other time period.

13. The method of claim 8, further comprising:
filtering one of the produced thermal energy load and the temperature of the gas or the liquid; and
predicting the induced thermal energy load during the non-steady state portion of the time period based on the filtered one of the produced thermal energy load and the temperature of the gas or the liquid.

14. The method of claim 8, further comprising:
assigning thermal energy loads to the supply device and the consuming device to maintain the temperature within an allowable temperature range based on the model; and
operating the energy plant according to the assigned thermal energy loads.

15. A non-transitory computer readable medium storing instructions for an energy plant including a loop formed by a plurality of devices, the instructions when executed by a processor cause the processor to:
obtain load data indicating a produced thermal energy load produced by a supply device of the plurality of devices during a time period;
obtain a temperature of gas or liquid in the loop during the time period;
predict an induced thermal energy load at a consuming device of the plurality of devices during a non-steady state portion of the time period based on the produced thermal energy load during a steady state portion of the time period;
generate a model indicating a relationship between (i) the temperature of the gas or the liquid in the loop and (ii) a difference between the induced thermal energy load and the produced thermal energy load, based on the predicted induced thermal energy load, the produced thermal energy load, and the temperature; and
operate the plurality of devices of the energy plant using to the model to control the temperature of the gas or the liquid in the loop.

16. The non-transitory computer readable medium of claim 15, wherein:
the temperature of the gas or the liquid changes beyond a predetermined range during the non-steady state portion, and
the temperature of the gas or the liquid remains within the predetermined range during the steady state portion.

17. The non-transitory computer readable medium of claim 15, wherein the instructions when executed by the processor further cause the processor to:
determine a thermal mass of the gas or the liquid in the loop based on the predicted induced thermal energy load during the non-steady state portion; and
generate the model based on the thermal mass.

18. The non-transitory computer readable medium of claim 15, wherein the instructions when executed by the processor cause the processor to:
obtain another temperature of the gas or the liquid in the loop during another time period after the time period; and
predict a deferred load in the loop during the other time period based on the other temperature and thermal mass of the gas or the liquid.

19. The non-transitory computer readable medium of claim 18, wherein the instructions when executed by the processor cause the processor to:
obtain additional load data indicating additional produced thermal energy load produced by the supply device during the other time period; and
predict an additional induced load at the consuming device during the other time period based on the deferred load and the additional produced thermal energy load during the other time period.

20. The non-transitory computer readable medium of claim 15, wherein the instructions when executed by the processor cause the processor to:
assign thermal energy loads to the supply device and the consuming device to maintain the temperature within an allowable temperature range based on the model; and
operate the energy plant according to the assigned thermal energy loads.

* * * * *